United States Patent
Baek et al.

(10) Patent No.: US 9,402,047 B2
(45) Date of Patent: Jul. 26, 2016

(54) METHOD AND APPARATUS FOR IMAGE DISPLAY

(71) Applicant: SAMSUNG ELECTRONICS CO., LTD., Suwon-si (KR)

(72) Inventors: Yun-sun Baek, Suwon-si (KR); Yong-tae Kim, Suwon-si (KR); Jun-seong Hong, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 14/468,750

(22) Filed: Aug. 26, 2014

(65) Prior Publication Data

US 2015/0055016 A1 Feb. 26, 2015

(30) Foreign Application Priority Data

Aug. 26, 2013 (KR) ........................ 10-2013-0101291

(51) Int. Cl.
*H04N 21/43* (2011.01)
*H04N 5/445* (2011.01)
*H04N 5/45* (2011.01)
*H04N 5/765* (2006.01)
*H04N 21/41* (2011.01)
*H04N 21/431* (2011.01)
*H04N 21/433* (2011.01)
*H04N 21/472* (2011.01)
*H04N 21/8547* (2011.01)

(52) U.S. Cl.
CPC ............. *H04N 5/44582* (2013.01); *H04N 5/45* (2013.01); *H04N 5/765* (2013.01); *H04N 21/4122* (2013.01); *H04N 21/4316* (2013.01); *H04N 21/4331* (2013.01); *H04N 21/47217* (2013.01); *H04N 21/8547* (2013.01)

(58) Field of Classification Search
CPC ...................................................... H04N 21/43
USPC ........................................ 348/563–565, 569
See application file for complete search history.

(56) References Cited

U.S. PATENT DOCUMENTS

| 8,010,489 B2* | 8/2011 | Takai ................ G06F 17/30997 707/628 |
| 8,203,592 B2 | 6/2012 | Nelson et al. |
| 8,358,273 B2* | 1/2013 | Hodge .................... G09G 3/20 345/156 |
| 8,648,966 B2* | 2/2014 | Lee ..................... G06F 3/04817 348/468 |
| 8,774,607 B2* | 7/2014 | Holden ................ G11B 27/005 386/239 |
| 8,819,733 B2* | 8/2014 | Crew ................. H04N 5/44543 725/39 |
| 8,990,721 B2* | 3/2015 | Choi ..................... G06F 9/4445 715/753 |
| 2013/0103770 A1* | 4/2013 | Kamolz .............. H04L 65/4076 709/206 |
| 2014/0201776 A1* | 7/2014 | Minemura ......... H04N 21/2541 725/25 |
| 2014/0211096 A1* | 7/2014 | Itoh .................... H04N 5/44591 348/725 |
| 2015/0026714 A1* | 1/2015 | Yuan ................ H04N 21/25841 725/32 |
| 2015/0163563 A1* | 6/2015 | An ..................... H04N 21/4668 725/18 |
| 2015/0264092 A1* | 9/2015 | Herger .................. H04L 65/403 709/204 |

* cited by examiner

*Primary Examiner* — Paulos M Natnael
(74) *Attorney, Agent, or Firm* — Sughrue Mion, PLLC (57) ABSTRACT

A display method and display apparatus are provided. The method includes receiving information about video content that is displayed by an external device, displaying the video content displayed by the external device on a screen of the display apparatus, based on the received information, receiving a first input regarding the displayed video content from a user of the display apparatus, displaying at least one first image on a first area of the screen, based on information received for a predetermined period of time in response to receiving the first input, and displaying a second video content on a second area of the screen, based on information received after the receiving of the first input.

19 Claims, 5 Drawing Sheets

METHOD AND APPARATUS FOR IMAGE DISPLAY

CROSS-REFERENCE TO RELATED APPLICATION(S)

This application claims priority Korean Patent Application No. 10-2013-0101291, filed on Aug. 26, 2013, in the Korean Intellectual Property Office, the disclosure of which is incorporated herein in its entirety by reference.

BACKGROUND

1. Field

Apparatuses and methods consistent with exemplary embodiments relate to image display, and more particularly, to displaying a shared image transmitted from an external device.

2. Description of Related Art

Recently, as wired/wireless network technology has rapidly developed and the performance of devices has improved, an image displayed on one device may be shared with another device in real time. For example, when we want to share documents, videos, and the like, with other people during a meeting, a seminar, and the like, the image displayed on a device may be shared.

In general, the device becomes a server and transmits the document, video data, and the like to the devices to share in a multicast or unicast way. However, it can be difficult for users and may take up a lot of time for the device to transmit the document and video data directly to all devices which want to share the data. Also, problems may occur when sharing the content displayed on the screen because users who share may have different interests and the content may be displayed differently on their screen.

SUMMARY

According to an aspect of an exemplary embodiment, there is provided a display method of display apparatus, the display method including receiving information about video content that is displayed by an external device, displaying the video content displayed by the external device on a screen of the display apparatus, based on the information received, receiving a first input regarding the displayed video content from a user of the displaying at least one first image on a first area of the screen, based on the information received for a predetermined period of time in response to receiving the first input, and displaying the second video content on a second area of the screen, based on the information received after the first input.

The method may further include the receiving of a second input from the user, and displaying the second video content on the first area of the screen at a predetermined speed based on the second input.

The receiving may include receiving time stamp information along with at least one image.

The method may further include comparing time stamp information of the first video content displayed on the first area with time stamp information of the second video content displayed on the second area, and displaying the second video content on an entire area of the screen based on the comparison result.

The predetermined speed of the second video content on the first area may be faster than the speed of second video content on the second area.

The method may further include the receiving of the second input from the user, and displaying the second video content on the second area on an entire area of the screen based on the second input.

The displaying the first video content on the first area of the screen may include displaying at least one image frame of the first video content in a thumbnail view.

The displaying the first video content on the first area of the screen may include providing the user with a search window comprising a plurality of video frames of the first video content in a reverse order, receiving input from the user that searches the plurality of video frames in a reverse-time order; and displaying one of the one or more of the plurality of video frames on the first area of the screen based on the input.

The method may further include storing the information received. The storage may delete the information after storing it for a predetermined period. The second area of the screen may include a pop-up window or a picture-in-picture window.

According to an aspect of another exemplary embodiment, there is provided a non-transitory computer readable recording medium which stores a program to implement the method.

According to an aspect of another exemplary embodiment, there is provided an image display apparatus including a receiver configured to receive information about video content that is displayed by an external device, a display configured to display the video content displayed by the external device on a screen based on the received information, and a user input receiving unit configured to receive a first input from a user regarding the displayed video content. The display is configured to display first video content on a first area of the screen, based on the information received for a predetermined period of time in response to receiving the first input, and display the second video content on a second area of the screen, based on the information received after the first input.

The user input receiving unit may receive a second input from the user, and the display may display the second video content on the first area of the screen at a predetermined speed based on the second input.

The receiver may receive time stamp information along with the video content, and the display may further include an image comparator configured to compare time stamp information of the first image on the first area with time stamp information of the second video content on the second area, and display the second video content on an entire area of the screen based on the comparison.

The predetermined speed of the second video content on the first area may be faster than the speed of the second video content displayed on the second area. The user input receiving unit may receive a second input from the user, and the display may display the second video content on the second area on an entire area of the screen based on the second input. The display may display the at least one image frame of the first video content in a thumbnail view.

The display may provide the user with a search window comprising a plurality of video frames of the first video content in a reverse order, the user input receiving unit may receive input from the user that searches the plurality of video frames in a reverse-time order, and the display may display one of the plurality of video frames on the first area of the screen based on the input.

The apparatus may further include a storage configured to store the received information.

The storage may delete the information after a lapse of a predetermined amount of time lapses.

The second area of the screen may be a pop-up window or a picture-in-picture.

According to an aspect of another exemplary embodiment, there is provided a display apparatus including a display, a receiver configured to receive image data from an external device, the image data comprising information corresponding to a plurality of frames of video being displayed by the external device, and a controller configured to control the display to display the plurality of frames of video being displayed by the external device based on the received image data.

The controller may control the display of the display apparatus to display the plurality of frames of video data approximately in sync with the plurality of frames of video data being displayed by a display of the external device.

The controller may control the display to display a plurality of video frames previously played by the external device on a first area of the display, and display a plurality of video frames currently being played by the external device on a second area of the display.

A user may manipulate the plurality of video frames previously displayed on the first area of the display, via an input unit of the display apparatus, while the plurality of video frames displayed on the second area of the display continue to play.

BRIEF DESCRIPTION OF THE DRAWINGS

These and/or other aspects will become apparent and more readily appreciated from the following description of exemplary embodiments, taken in conjunction with the accompanying drawings in which.

DETAILED DESCRIPTION

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain examples of the present description.

Throughout the specification, when a portion connects with another portion, an electronic connection with another element between portions may be included along with a direct connection. Also, when a portion includes an element, another element may be further included, rather than excluding the existence of the other element, unless otherwise described.

Figure 1:
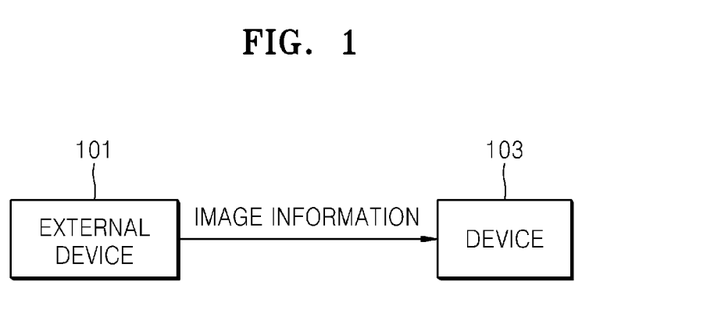
FIG. 1 is a system diagram illustrating the relationship between a device and an external device according to an exemplary embodiment.

FIG. 1 is a system diagram illustrating the relationship between a device 103 and an external device 101 according to an exemplary embodiment.

Referring to FIG. 1, the external device 101 transmits image information to the device 103. For example, the external device 101 may include a server device and may also include a device which takes a role of a master or coordinator in a network. The external device 101 may transmit an image displayed on its screen, such as a device directly controlled by a presenter during a meeting or by a teacher during a class, in order to share the image with other devices.

The image or image data as described herein may include content such as a video, a broadcast video, still images, moving picture images, a presentation, a slide show, and the like.

The external device 101 may include a camera. Accordingly, an image received by an input of the camera of the external device 101 may be transmitted to the device 103. The external device 101 may transmit only an image without audio to reduce a delay of time for image sharing.

For example, image-related information may include an image displayed on the screen of the external device 101. When the external device 101 displays an image or a video, the external device 101 may transmit a file used for displaying on the screen of the external device 101 to the device 103 and may transmit data uploaded from a memory for displaying on the screen of the external device 101 to the device 103. Also, the external device 101 may capture an image of the screen and transmit it to the device 103. The image-related information may include meta data transmitted in order to share the image of the external device 101 with the device 103.

The external device 101 may transmit the image on its screen continuously to the device 103. Also, at least one image may have at least one frame. For example, when the external device 101 displays a video, it may transmit multiple frames composing the video to the device 103.

The image information may be transmitted in real time. For example, every time the image displayed on the external device 101 changes, the changed image may be transmitted to the device 103. It is also possible for the external device 101 to transmit the image of the external device 101 to the device 103 at a predetermined interval, for example, based on a user's setting.

If a network delay is not considered when the external device 101 transmits the image-related information to the device 103 in real time, it may be assumed that the content of the external device 101 is displayed on the device 103 at the same time. However, when taking into account a network delay, the device 103 and the external device 101 may be set to perform a process such as synchronization in order to display the identical image on their screens at the same time.

In these examples, the device 103 may include a client. In addition, the device 103 may be a device which takes the role of a slave in a network. For example, the device 103 may include a smart television, a mobile phone, a tablet, a personal computer, a server, an appliance, and the like. In addition, it should also be appreciated that there may be multiple devices 103. Accordingly, the external device 101 may transmit the image-related information to a plurality of devices 103 and the plurality of devices 103 may display the received image information so that the identical image may be shared among at least two devices.

In response to receiving the image information, the device 103 displays the received image information on the screen. When doing this, the device 103 may displays the image based on various user's inputs so that a user can watch the received image information as the user desires. Examples of this are described with reference to FIGS. 2 to 7.

Figure 2:
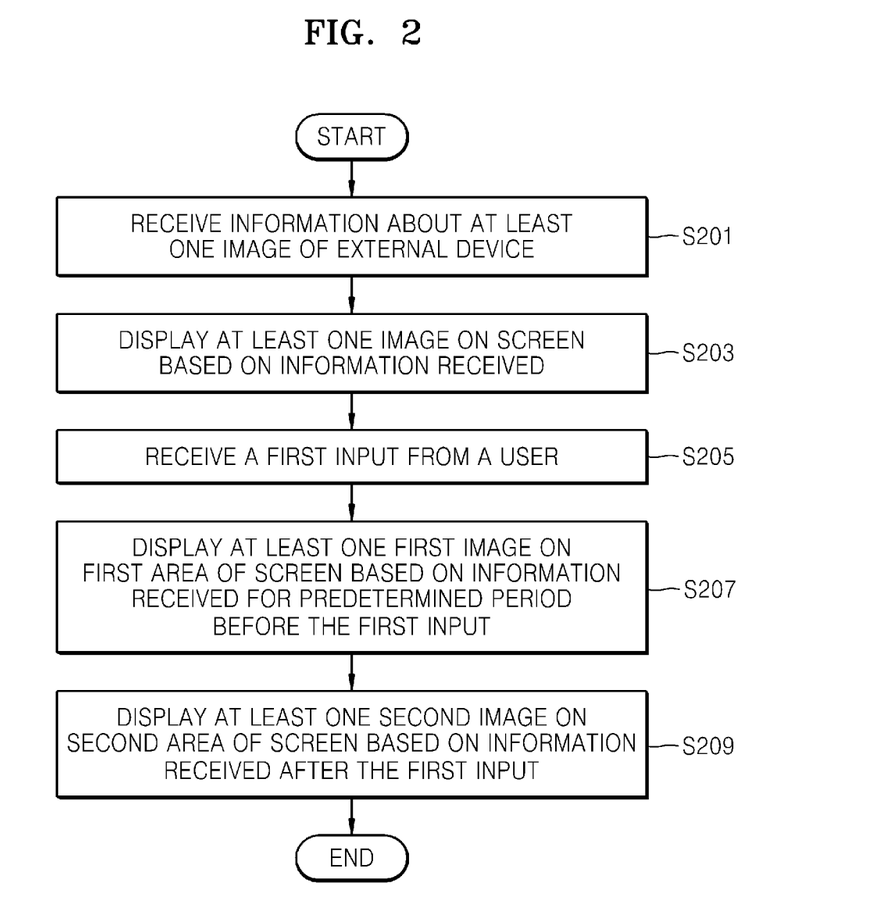
FIG. 2 is a flowchart illustrating a method of displaying an image according to an exemplary embodiment.

FIG. 2 is a flowchart illustrating a method of a device displaying an image according to an exemplary embodiment.

In operation S201, a device receives the information about at least one image from the external device. Here, the external device transmits the image-related information to the device in order to share the image displayed on the screen of the external device, with the device.

For example, the image-related information may include not only data rendered but also document files, image files, video files, and the like, for displaying data on the screen of the external device. That is, the image-related information may include the image itself and the information for decoding and rendering the image in the device such as the information on an image's time stamp, the size of image, the image compression type, a type of codec, and the like. In response, the device may store the image and information received from the external device. Further, the device may delete the data after a predetermined period of time.

In operation S203, the device displays at least one image on the screen based on the information received from the external device. For example, the device may receive the image from the external device in real time. That is, the device receives the information displayed on the external device continuously. By receiving the image from the external device and displaying the image in sequence, the device may display the same image on a screen thereof corresponding to the image displayed on the screen of the external device.

The device may display the image on the screen after decoding and rendering the image-related information received. That is, the external device may compress the data including the image-related information for a smooth and fast transmission and encode the data including the image-related information for security. After receiving the encoded image-related information, the device decodes and renders the information to display it on the screen. Based on a user's setting for the external device, as another example, the external device may transmit the image to the device so that the device receives and reproduces the image without other processes such as decoding. In addition, packets may be merged and split and the devices may conduct a request process for error-repairing and retransmission during the transmitting.

The display screen may denote the entire screen on which the image can be displayed. As another example, the screen used for display may be only a portion of the entire screen.

In operation S205, the device receives a first input from the user. The device may receive the first input from the user while displaying the image received from the external device. For example, the first input from the user may be related to a command such as a pause operation, or any other types of inputs to change the way of displaying the current image of the device, such as a repeat operation, a rewind operation, and the like.

The first input is received through a user interface. The user interface may include a touch screen, a keyboard, a mouse, a track ball, a touch pen, a camera, a speech recognition module, and the like. That is, the device may receive the first input from the user in various ways. For example, a user may enter the first input into the device by touching the area on which the first image is displayed and choosing an icon which the device represents.

In operation S207, the device displays at least one first image on the first area of the screen based on the image-related information received during a predetermined time period which includes when the device starts the receiving of the first input from the user back to a predetermined previous time. For example, the user may enter the first input into the device in case of missing an image the user has wanted to watch. The device displays the image the user missed on an area of the screen based on the information received for a predetermined prior period of time until the receiving of the first input from the user.

For example, if the device receives the first input from the user when 15 seconds of video frames have passed after receiving the image from the external device, the device may display the images (i.e. video frames) received for the previous 15 seconds on the first area of the screen. That is, the user may watch the previous screen again. Depending on the user's setting, the device may display the images for a predetermined time lapse (e.g., images displayed from 5 seconds to 15 seconds) on the first area of the screen.

The information received during a predetermined time period which starts from the receiving of the first input and includes back to a predetermined previous time refers to the images which have been displayed on the screen before entering the first input. For example, when the device has displayed the image data for 20 seconds, the device may display at least one image from among the video frames which has been displayed for the last 20 seconds on the first area of the screen again. As an example, the device may display the previous 20 seconds of video content on the display while at the same time also continuing to display content that is currently being played by the external device.

The at least one image may be displayed in a thumbnail view. In other words, when there are images received before a certain time, a representative image that is received may be displayed in the thumbnail view or the plurality of images received may each be displayed as thumbnails. Also, when displaying an image in the thumbnail view, the device may also display a reference frame.

The device may display one or more images on the screen after receiving the input from the user which searches the image in a reverse time order. In other words, the device may receive an input from the user corresponding to a command for searching for an image among video still images using a scroll bar and may display the image the user wants. The device may store the image in a time order or in a reverse-time order and the device may display the searched image based on the input from the user on the first area of the screen. For example, the first area may be a larger area on a screen be configured in a picture-in-picture (PIP) mode, but is not limited to the aforementioned example.

In operation S209, the device displays at least one second image on a second area of the screen based on the information received after the receiving of the first input. The at least one second image may include the image that the external device is displaying on its screen. For example, if the device receives the first input from the user after 15 seconds have passed since the device started to receive the image data from the external device, the device may display the first 15 seconds of video on the first area of the screen, and the video after 16 seconds on the second area of the screen.

In other words, the device may display at least one image displayed on the screen before the first input from the user, and on the second area of the screen, the device displays at least one image which would be displayed if there were not the first input from the user. For example, the image displayed on the second area may be the image transmitted from the external device in real time and may be the same as the image that the external device is displaying. In addition, when the device needs more time to perform rendering and decoding, additional processes can be added to synchronize the device and the external device.

The second area of the screen may provide a type of pop-up. Additionally, the second area of the screen may be configured in a picture-in-picture (PIP) mode. It should also be appreciated that there are no limitations on types and display areas on the screen of the first and second areas. Furthermore, in some examples, the device may perform operations S207 and S209 at the same time or the device may perform operation S209 first.

The device may display both the image missed by the user and the image currently displayed by the external device on a screen, by receiving the first input from the user. Thus, the user, at the same time, may watch both the images that were previously displayed and an image that is currently being received from and displayed by the external device.

Figure 3:
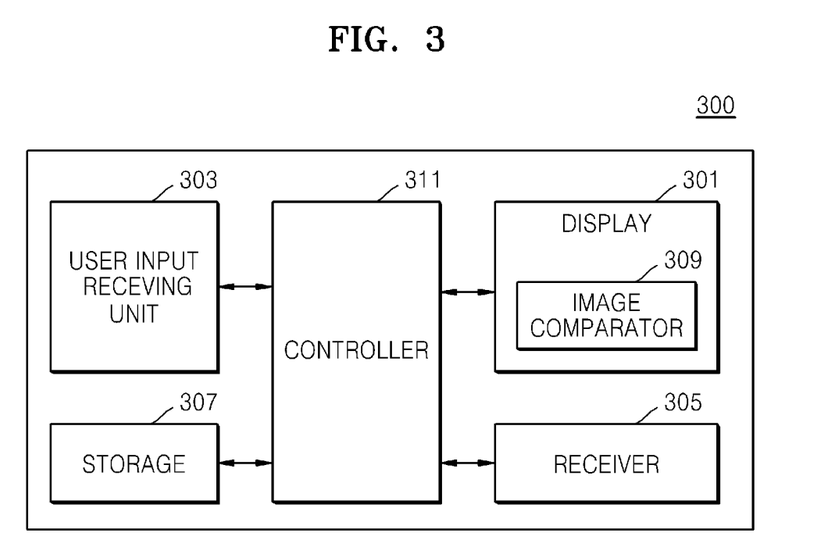
FIG. 3 is a block diagram of a device which displays an image according to an exemplary embodiment.

FIG. 3 is a block diagram of a device 300 which displays an image according to an exemplary embodiment.

Referring to FIG. 3, the device 300 includes a display 301, a user input receiving unit 303 and a receiver 305. The device 300 further includes a storage 307 and a controller 311.

The display 301 displays at least one image based on the image-related information received by the receiver 305 from an external device. The image-related information includes the image and/or information about the image that the external device is displaying. For example, the receiver 305 may receive a reference frame and other frames.

For example, the display 301 may display a first image or a first video content on the first area of the screen based on the image-related information received over a predetermined period of time in response to the user input receiving unit 303 receiving the first input from the user.

Furthermore, the display 301 may display at least one first image or at least one first video content on the first area of the screen based on the image-related information received over a predetermined period of time in response to the user input receiving unit 303 receiving the first input from the user.

For example, the display 301 may display a first image or video on the first area of the screen based on the image-related information received over a predetermined prior period of time prior to the user input receiving unit 303 receiving the first input from the user. The display 301 may also display a second image or video on a second area of the screen based on the image-related information received after the user input receiving unit 303 receives the first input.

The display 301 may display a representative image or images corresponding to the first video in a thumbnail view. In addition, the device 300 may receive the image as a result of the external device continuously transmitting a current image displayed on its screen to the device 300. The display 301 may display at least one image received from the external device before the first input from the user in the thumbnail view. As another example, the display 301 may display a reference frame among multiple frames as the thumbnail view.

The display 301 may provide the user with a function for searching an image that the user wants in a time order or in a reverse-time order using a scroll bar to find an image from among video still images.

The display 301 may divide the screen into the first area and the second area, for example, using a picture-in-picture (PIP) mode, a pop-up window mode, and the like, but is not limited to the aforementioned examples.

The display 301 may display a second image corresponding to information received after the first input is received and up until a point when a second input from the user is received by the input receiving unit 303. Furthermore, the display 301 may display at least one second image or at least one second video content corresponding to information received after the first input is received and up until a point when a second input from the user is received by the input receiving unit 303. The display 301 may control a displaying speed of the second image on the first area. For example, the device 300 may display the second video image displayed on the first area at a faster speed than the displaying speed of the second video image on the second area.

As an example, when the device 300 receives a first input such as a stop or a rewind after 15 seconds have passed since the device 300 started to display the video, the display 301 may display the video content from 1 second to 15 seconds on the first area of the screen and continue displaying the currently played video content on the second area. In other words, the display 301 displays the video displayed on the screen from 16 seconds and on, on the second area.

If the device 300 receives a second input 15 seconds after the device 300 received the first input, that is, when 30 seconds have passed since the device 300 starts to display the image, the display 301 may display the image received after the first input on the first area. In this case, the device 300 may also continue to display the image received from the external device on the second area. Furthermore, based on a user's setting, the display 301 may control a displaying speed of the first area to be a faster speed than the displaying speed of the second area, or vice versa.

In this example, the images displayed on the first area and the second area of the screen of the device 300 are both received from the external device. As another example, the device 300 may display the image that the external device is now displaying on the second area in real time and display a previous image on the first area.

In the example of FIG. 3, the display 301 may include an image comparator 309. The image comparator 309 may compare time stamp information of the image that the receiver 305 received with the image. The display 301 may display the second image on the screen based on the comparison result of the image comparator 309. For example, the display 301 may display at least one second image on the first area of the screen based on the data received from the external device after the first input from the user. When the image displayed on the first area of the screen is displayed at a faster speed than the displaying speed of the image on the second area, the frames of both images may become identical after a certain amount of time passes.

When the frames of the images displayed on the first area and second area become the same, the display 301 may display the image of the second area on the screen. For example, the display 301 may display the image that the external device is now displaying on the screen as was displayed before the first input from the user. Also, when the device 300 receives the second input from the user, the device 300 may display the image of the second area on the screen.

The display 301 may further include a display controller (not shown) which may control a displaying speed and a displaying area of the image along with the display 301. Also, the controller 311 may control a displaying speed and a displaying area of the image.

The user input receiving unit 303 receives the input from the user. For example, the user input receiving unit 303 may include a touch screen, a keyboard, a mouse, a touch pad, a speech recognition module, a camera for receiving user motion input, and the like, but the present description is not limited to the aforementioned examples. The user input receiving unit 303 may receive multiple inputs such as a first input, a second input, a third input, and the like, from a user. In this example, the first input, the second input, and the third input may be input via different devices such as the examples listed above.

The receiver 305 receives the image-related information from the external device. For example, the receiver 305 may receive the image that the external device is currently displaying on its screen. The receiver 305 may also receive additional data such as meta data and time stamp information along with the image.

In addition, the receiver 305 may receive an annotation of the image. The annotation refers to content in addition to the original image which the external device displays on its screen. The annotation may be determined based on a user's input on the external device. For example, the annotation may include an underline, inserting a letter, a highlight, and the like.

The device 300 may further include a storage 307. The storage 307 may store the image-related information that is received from the external device. The storage 307 may store the images in groups or other units. For example, a reference frame and other frames which are different from the reference frame may be stored in a group. The storage 307 may stores the image in order or in a reverse time order. For example, the storage 307 may store a group of video frames that make up a video content, such as 10 seconds, 30 seconds, one minute, 10 minutes, and the like, in a group. In addition, the storage 307 may delete the data stored after storing it for a predetermined time.

In some examples, the device 300 may further include a transmission unit (not shown). The transmission unit may transmit the annotation which the user entered into the external device while the device 300 displays the image. In response to receiving the information about the annotation from the device 300, the external device may display the same annotation as the device 300. The device 300 may further include at least one renderer (not shown) and at least one decoder (not shown). In addition, the controller 311 may control all elements included in the device 300 and may include a calculation unit like a central controller such as a central processing unit (CPU), and the like.

Figure 4:
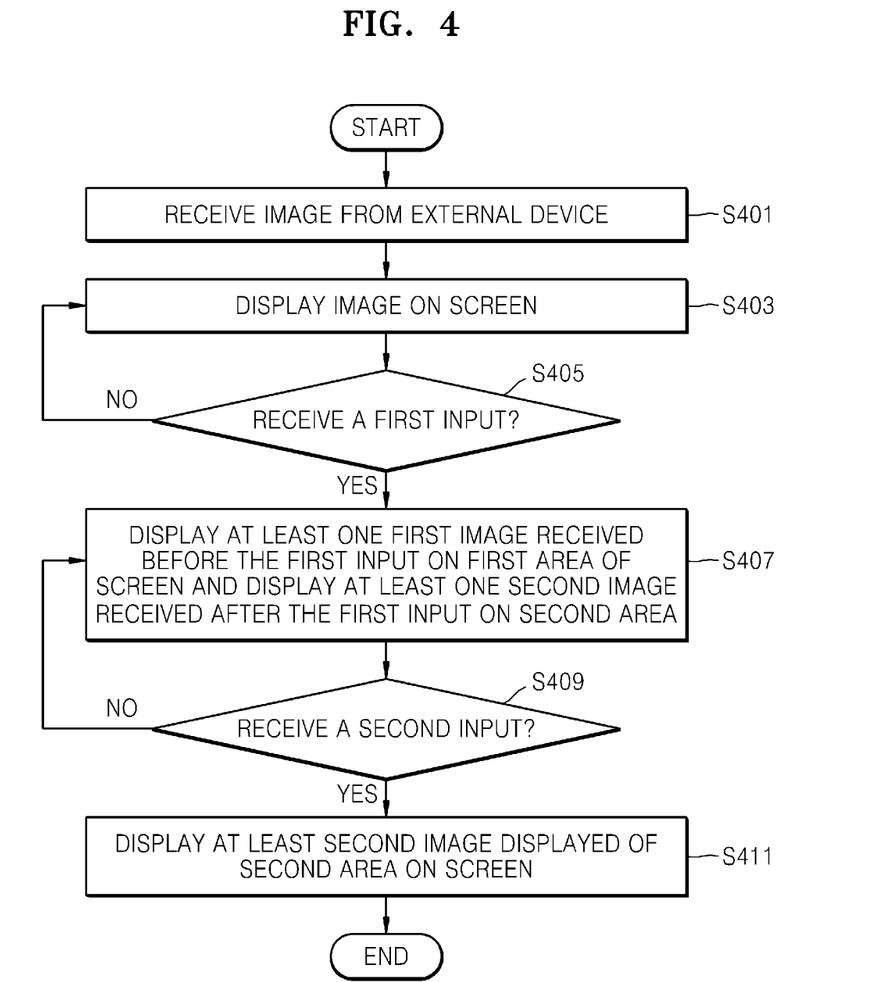
FIG. 4 is a flowchart illustrating a method of a device displaying an image according to another exemplary embodiment.

FIG. 4 is a flowchart illustrating a method of a device displaying an image according to another exemplary embodiment.

In operation S401, the device receives the image-related information from the external device. For example, the image-related information may include a video which includes one or more images displayed on the external device. The external device may continuously transmit the image displayed on its own screen to the device. For example, the external device may capture content displayed on its screen and transmit the content captured to the device. As another example, the external device may transmit data that is uploaded from a memory in order to be displayed on its screen, to the device.

In operation S403, the device displays the image on the screen based on the image-related information received. For example, the image that the device is displaying may be the same as the image that the external device is now displaying. That is, the external device may transmit and the device may receive the image from the screen of the external device in real time. The device displays at least one image on the screen based on the image-related information received from the external device.

In operation S405, the device determines whether it receives the first input from the user about at least one image. If the device does not receive the first input from the user, the device continues to display at least one image on the screen based on the image-related information received from the external device. That is, the device keeps doing operation S403 without additional operation.

If the device receives the first input from the user, in S407 the device displays at least one image received before the first input on the first area of the screen and displays at least one second image received after the first input on the second area of the screen. For example, the device may divide the screen and display the image displayed before on the first area of the screen again, and display the image currently received from the external device on the second area of the screen. The device may display the images by generating an additional window instead of displaying the images by allocating the images into the first area and the second area. The device may also display the image in types of picture-in-picture or a pop-up window and display the image by dividing the area within the screen.

In operation S409, the device determines whether it receives the second input. If the device does not receive the second input, the device may display the image on the first and second areas of the screen respectively, like operation S407, without additional operation. If the device receives the second input from the user, the device displays at least one second image of the second area of the screen on the screen as is the case with operation S411. For example, when the device receives the second input from the user while displaying the image on the first and second areas respectively, the device may display the image displayed on the second area of an undivided screen. The second image displayed on the second area is the same as the image the external device is currently displaying on its screen.

As another example, when the device receives the second input from the user, the device may change the way of displaying the images on the first area and second area respectively. In other words, as explained in FIG. 3, the device may display at least one image received after the first input from the user on the first area. Additionally, the device may display the images of the first area and the second area in a thumbnail view and may also arrange and display the image in order to search the image in a time order.

Figure 5:
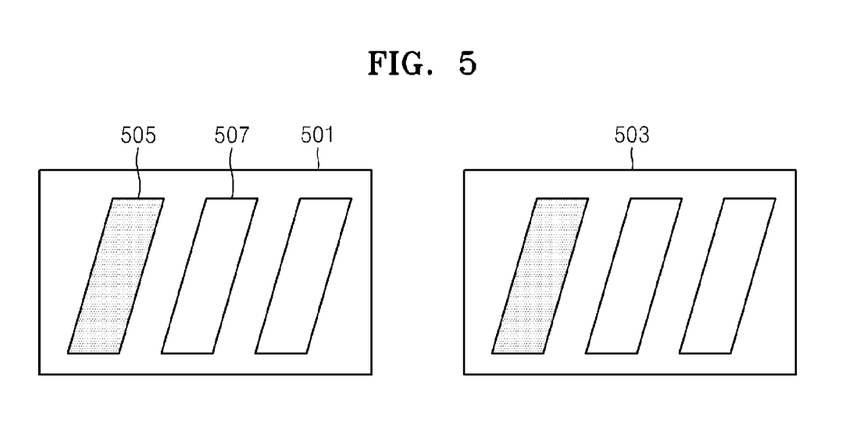
FIG. 5 is a diagram illustrating a device saving an image according to an exemplary embodiment.

FIG. 5 is a diagram illustrating a device saving an image according to an exemplary embodiment.

Referring to FIG. 5, the device may store the image received from the external device. In this example, the device stores the image as groups 501 and 503. Image group 503 includes a reference frame 505 and another frame 507 that is a different frame from the reference frame 505. For example, the device may store the image-related information received and may display the image included in the stored image-related information on the screen after decoding and rendering the image. As another example, the device may not need to decode and render the image based on the types of the image-related information received.

When the device receives the first input from the user, the device may display at least one first image corresponding to content previously displayed on the screen, on the first area of the screen using the image stored. When the device receives the second input from the user, the device may display at least one second image corresponding to content previously displayed on the screen but after the first input, on the second area of the screen. For example, the second image may be displayed on the first area and may also display at least one second image on the whole screen, by using the image stored.

According to various aspects, the device allows the user to watch video content more conveniently by receiving an input from the user and by displaying both the image currently being displayed by the external device and an image previously displayed on the external device at the same time.

According to various aspects, the external device transmits the image displayed on its screen. Also, the external device may transmit a video in the same manner as the image because video is also a set of at least one image. Accordingly, the external device may transmit the image displayed on its screen in real time. In other words, the external device may transmit the image to the device whenever the image of the external device changes. As another example, the external device may transmit the image displayed on its screen based on a predetermined interval and/or a predetermined speed (e.g., frame per second (FPS)) depending on the user's setting.

Figure 6:
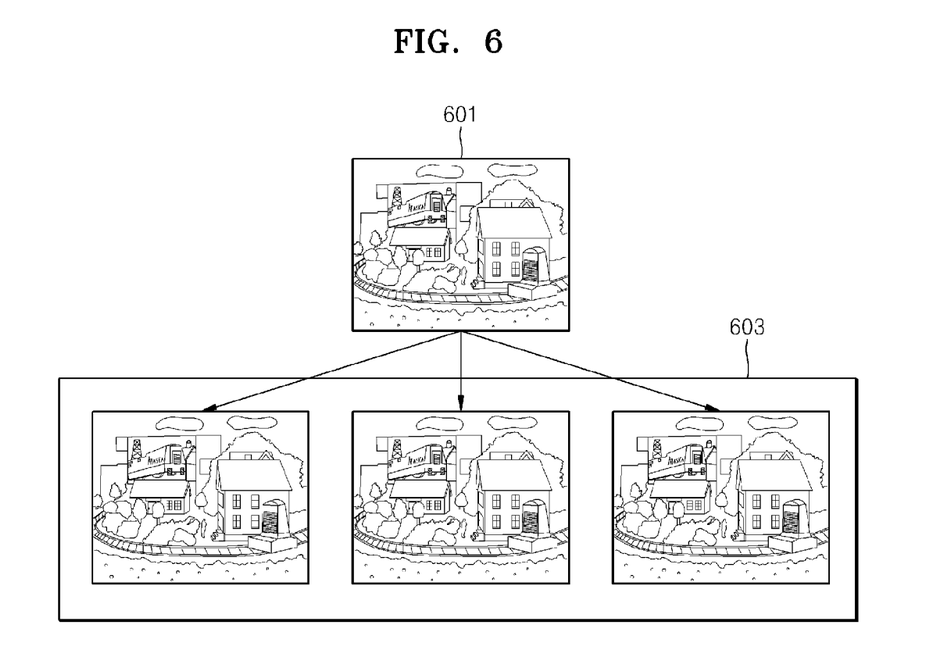
FIG. 6 is a diagram which illustrates an example of a device displaying an image on a screen according to an exemplary embodiment.

FIG. 6 is a diagram an example of a device displaying an image on a screen according to an exemplary embodiment.

Referring to FIG. 6, the external device 601 transmits the image displayed on its screen to one or more devices 603. In other words, one or more devices 603 may display the same image as the external device 601. The external device 601 may transmit the image displayed on its screen to one or more devices 603 through various networks. In this non-limiting example, the one or more devices 603 include three devices.

For example, the external device 601 may transmit the image to the devices 603 each time the image changes on the external device 601. In response, the devices 603 display the image received from the external device on their own screen. In addition, the external device 601 may transmit information about the image to the devices 603.

One or more of the devices 603 may receive a first input from the user. When a device 603 receives the first input, the device 603 may change the way the image is displayed as is seen and as will be further discussed in the example of FIG. 7. The devices 603 may receive the first input from the user through various ways. For example, the user may touch the screen displaying the image or may enter the first input to the device by touching a button on a remote controller, a button mounted or marked on the device, and the like.

Figure 7:
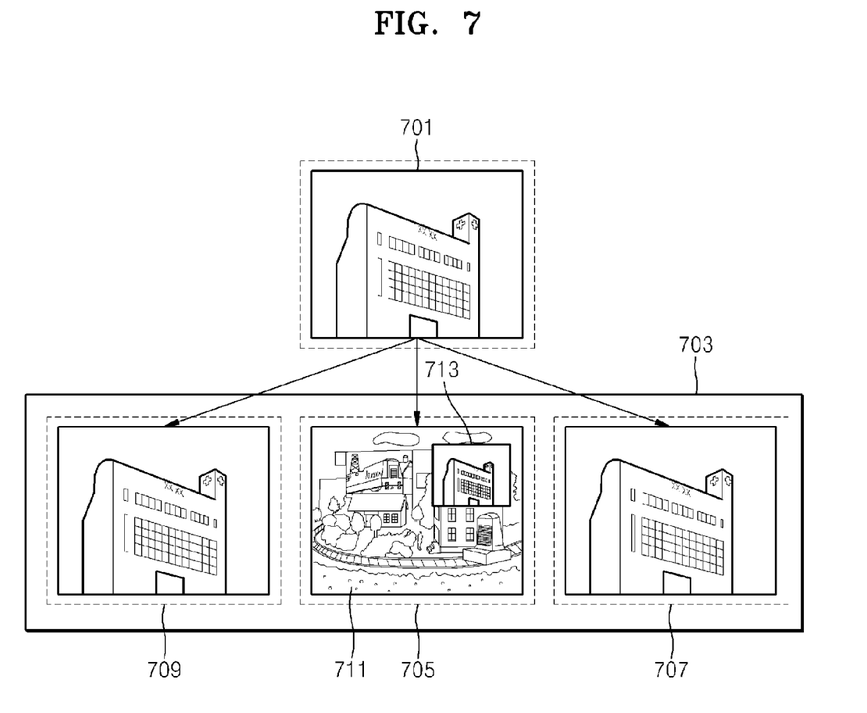
FIG. 7 is a diagram which illustrates an example of a device displaying an image on a screen according to another exemplary embodiment.

FIG. 7 is a diagram illustrating a device displaying an image on a screen according to another exemplary embodiment.

Compared with FIG. 6, FIG. 7 illustrates an example of the screen of the external device 701 and the screen of the devices 703 after a predetermined period.

Referring to FIG. 7, device 705 receives a first input from the user. Thus, the device 705 is displaying different images on the first area and on the second area of the screen, respectively. In this example, larger screen 711 of the device 705 displays the image in FIG. 6 which is the previously displayed image. For example, larger screen 711 of the device 705 refers to the first area of the screen on the device 705.

In addition, smaller screen 713 of the device 705 displays the image that the external device 701 is now displaying. Referring to FIG. 7, the small screen 713 of the device 705 is displaying the same image as the external device 701 and other devices of 707 and 709. Accordingly, the device 705 may continuously display the image received from the external device 701 and a previous image displayed by the external device 701. In this example, the smaller screen 713 of the device 705 refers to the second area of the screen on the device 705.

According to various aspects, when the device receives the second input from the user, the device may display the image on the screen as seen in FIG. 6. Also, the device may receive the second input from the user in various ways. For example, the user may enter the second input to the device by touching the smaller screen among spilt screens.

As described above, according to the one or more of the above embodiments, users of devices can conveniently share a screen displayed on an external device.

The device described herein may comprise a processor, a memory for storing program data and executing it, a permanent or semi-permanent storage unit such as a disk drive, a communications port for handling communications with external devices, and user interface devices, including a touch panel, keys, buttons, and the like. When software modules or algorithms are involved, these software modules may be stored as program instructions or computer-readable codes executable on a processor on a computer-readable recording medium. Examples of the computer-readable recording medium include magnetic storage media (e.g., ROM, RAM, floppy disks, hard disks, etc.), and optical recording media (e.g., CD-ROMs, digital versatile disks (DVDs), etc.). The computer-readable recording medium can also be distributed over network coupled computer systems so that the computer-readable code is stored and executed in a distributive manner. This media can be read by the computer, stored in the memory, and executed by the processor.

To promote understanding of one or more exemplary embodiments, reference has been made to the examples illustrated in the drawings, and specific language has been used to describe these embodiments. However, no limitation of the scope of the embodiments is intended by this specific language, and embodiments should be construed to encompass all embodiments that would normally occur to one of ordinary skill in the art.

The examples herein may be described in terms of functional block components and various processing steps. Such functional blocks may be realized by any number of hardware and/or software components configured to perform the specified functions. For example, the examples may employ various integrated circuit (IC) components, e.g., memory elements, processing elements, logic elements, look-up tables, and the like, which may carry out a variety of functions under the control of one or more microprocessors or other control devices. Similarly, where the elements are implemented using software programming or software elements, the elements may be implemented with any programming or scripting language such as C, C++, Java, assembler language, or the like, with the various algorithms being implemented with any combination of data structures, objects, processes, routines or other programming elements. Functional aspects may be implemented in algorithms that are executed on one or more processors. Furthermore, the present invention could employ any number of conventional techniques for electronics configuration, signal processing and/or control, data processing and the like. The words "mechanism," "element," "means," and "configuration" are used broadly and are not limited to mechanical or physical embodiments, but can include software routines in conjunction with processors, etc.

The particular implementations shown and described herein are illustrative examples and are not intended to otherwise limit the scope in any way. For the sake of brevity, conventional electronics, control systems, software development and other functional aspects of the systems may not be described in detail.

The use of the terms "a" and "an" and "the" and similar referents in the context of describing the examples (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Also, the operations of all methods described herein can be performed in any suitable order unless otherwise indicated herein or otherwise clearly contradicted by context. The embodiments are not limited to the described order of the operation. The use of any and all examples, or exemplary language (e.g., "such as") provided herein, is intended merely to better illuminate the exemplary embodiments and does not pose a limitation on the scope of the embodiments unless otherwise claimed. Numerous modifications and adaptations will be readily apparent to one of ordinary skill in the art without departing from the spirit and scope of the inventive concept.

What is claimed is:

1. A display method of a display apparatus, the method comprising:
   receiving a video content that is displayed by an external device and information about the video content;
   displaying the video content on a screen of the display apparatus, based on the information received;
   receiving a first input regarding the displayed video content from a user of the display apparatus;
   displaying first video content on a first area of the screen, the first video content being received for a predetermined period of time prior to receiving the first input; and
   displaying second video content on a second area of the screen, the second video content being received after the receiving of the first input,
   wherein the displaying of the first content on the first area of the screen comprises:
   providing the user with a search window comprising a plurality of video frames of the first video content in a reverse order in which they were received;
   receiving a second input from the user that searches the plurality of video frames in a reverse order; and
   displaying at least one of the plurality of video frames based on the second input.

2. The display method of claim 1, further comprising:
   receiving a third input from the user; and
   displaying the second video content on the first area of the screen at a predetermined speed based on the third input.

3. The display method of claim 2, wherein the predetermined speed of the second video content on the first area is faster than the displaying speed of the second video content on the second area.

4. The display method of claim 1, wherein the information about the video content comprises time stamp information, and the display method further comprises:
   comparing time stamp information of the first video content displayed on the first area with time stamp information of the second video content displayed on the second area; and
   displaying the second video content on an entire area of the screen based on the comparison.

5. The display method of claim 1, further comprising:
   receiving a fourth input from the user; and
   displaying the second video content displayed on the second area on an entire area of the screen based on the fourth input.

6. The display method of claim 1, wherein the displaying of the first video content on the first area of the screen comprises displaying at least one image frame of the first video content in a thumbnail view.

7. The display method of claim 1, further comprising:
   storing the video content and the information about the video content.

8. The display method of claim 7, wherein the storing the video content and the information about the video content comprises deleting the information after a predetermined amount of time lapses after storing the information.

9. The display method of claim 1, wherein the second area of the screen comprises a pop-up window or a picture-in-picture window.

10. An image display apparatus comprising:
    a receiver configured to receive a video content that is displayed by an external device and information about the video content;
    a display configured to display the video content displayed by the external device on a screen based on the received information; and
    a user input receiving unit configured to receive a first input from a user regarding the displayed video content,
    wherein the display is further configured to display first video content on a first area of the screen, the first video content being received for a predetermined period of time prior to receiving the first input from the user, and display second video content on a second area of the screen, the second video content being received after receiving the first input from the user, and
    wherein the display is configured to provide the user with a search window comprising a plurality of video frames of the first video content in a reverse order in which they were received, the user input receiving unit is configured to receive an input from the user that searches the plurality of video frames in a reverse order, and the display is configured to display at least one of the plurality of video frames based on the input from the user.

11. The image display apparatus of claim 10, wherein the user input receiving unit is configured to receive a third input from the user, and
    the display is configured to display the second video content on the first area of the screen at a predetermined speed based on the third input.

12. The image display apparatus of claim 11, wherein the predetermined speed of the second video content on the first area is faster than the speed of the second video content displayed on the second area.

13. The image display apparatus of claim 10, wherein the information about the video content comprises time stamp information, and
    the display further comprises an image comparator configured to compare time stamp information of the first video content displayed on the first area with time stamp information of the second video content displayed on the second area, and display the second video content on an entire area of the screen based on the comparison.

14. The image display apparatus of claim 10, wherein the user input receiving unit is configured to receive a fourth input from the user, and
    the display is configured to display the second video content on an entire area of the second area on the screen based on the fourth input.

15. The image display apparatus of claim 10, wherein the display is configured to display at least one image frame of the first video content in a thumbnail view.

16. The image display apparatus of claim 10, further comprising a storage configured to store the video content and the information about the video content.

17. The image display apparatus of claim 16, wherein the storage is configured to delete the information about the video content after a predetermined amount of time lapses.

18. The image display apparatus of claim 10, wherein the second area of the screen comprises a pop-up window or a picture-in-picture.

19. A non-transitory computer readable medium comprising a computer program that is executable by a computer to perform the display method of claim 1.

* * * * *